US010083592B1

(12) United States Patent
Bartlett et al.

(10) Patent No.: US 10,083,592 B1
(45) Date of Patent: Sep. 25, 2018

(54) APPARATUS, METHOD AND SYSTEM FOR ACOUSTICALLY DETECTING DEPLOYMENT OF PORTABLE EQUIPMENT

(71) Applicant: MOTOROLA SOLUTIONS, INC, Chicago, IL (US)

(72) Inventors: Rammone Bartlett, Delray Beach, FL (US); Peter Gilmore, Plantation, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/662,308

(22) Filed: Jul. 28, 2017

(51) Int. Cl.
| | | |
|---|---|---|
| *G08B 21/18* | (2006.01) | |
| *A41F 9/00* | (2006.01) | |
| *G08B 25/10* | (2006.01) | |
| *G10D 13/08* | (2006.01) | |
| *H04R 29/00* | (2006.01) | |
| *H04N 7/18* | (2006.01) | |

(52) U.S. Cl.
CPC .............. *G08B 21/18* (2013.01); *A41F 9/002* (2013.01); *A41F 9/007* (2013.01); *G08B 25/10* (2013.01); *G10D 13/08* (2013.01); *H04N 7/188* (2013.01); *H04R 29/00* (2013.01)

(58) Field of Classification Search
CPC ......... G08B 21/18; G08B 25/10; A41F 9/002; A41F 9/007; G10D 13/08; H04N 7/188; H04R 29/00
See application file for complete search history.

(56) References Cited

U.S. PATENT DOCUMENTS

| 6,959,203 | B2 * | 10/2005 | Claxton | H04B 1/3877 |
| | | | | 455/556.1 |
| 7,714,720 | B2 * | 5/2010 | Hietanen | F41A 17/063 |
| | | | | 224/243 |
| 8,941,623 | B2 | 1/2015 | Alberth et al. | |
| 9,167,375 | B2 | 10/2015 | Geris et al. | |
| 2006/0208857 | A1 * | 9/2006 | Wong | F41C 33/0209 |
| | | | | 340/5.82 |
| 2008/0061991 | A1 | 3/2008 | Urban et al. | |
| 2016/0011663 | A1 * | 1/2016 | Starner | G06F 1/163 |
| | | | | 340/407.2 |
| 2017/0016696 | A1 * | 1/2017 | Koskan | F41C 33/0209 |

FOREIGN PATENT DOCUMENTS

| WO | 2005010843 A1 | 2/2005 |
| WO | 2015156921 A1 | 10/2015 |

* cited by examiner

*Primary Examiner* — Sisay Yacob
(74) *Attorney, Agent, or Firm* — Barbara R. Doutre

(57) ABSTRACT

An apparatus, method and communication system are provided for acoustically detecting the deployment of equipment. The equipment may comprise portable objects (104), such as a gun, taser or baton, used by law enforcement. The apparatus comprises plurality of acoustical ridges (108) integrated within a body worn accessory (102). A predetermined sound pattern (130, 140) is generated from the acoustical ridges in response to sliding the portable object across the plurality of acoustical ridges integrated within a body worn accessory. Information pertaining to the portable object, such as dynamic information pertaining to the removal and insertion of the portable object to and from the body worn accessory (102) is determined. A communication system (300) including a portable communication device (112) can store the information and/or transmit alert signals to a base station (302) for tracking deployment of the portable object.

27 Claims, 3 Drawing Sheets

APPARATUS, METHOD AND SYSTEM FOR ACOUSTICALLY DETECTING DEPLOYMENT OF PORTABLE EQUIPMENT

FIELD OF THE DISCLOSURE

The present disclosure relates generally to detecting deployment of portable equipment, and more particularly to detecting withdrawal and insertion of a portable object in a portable environment.

BACKGROUND

The ability to detect deployment of law enforcement equipment is highly desirable. Challenges in detecting the deployment of equipment includes power consumption and size constraints of any device associated with the detection.

Accordingly, it would be desirable to have an improved apparatus, method, and system for detecting deployment of portable equipment.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
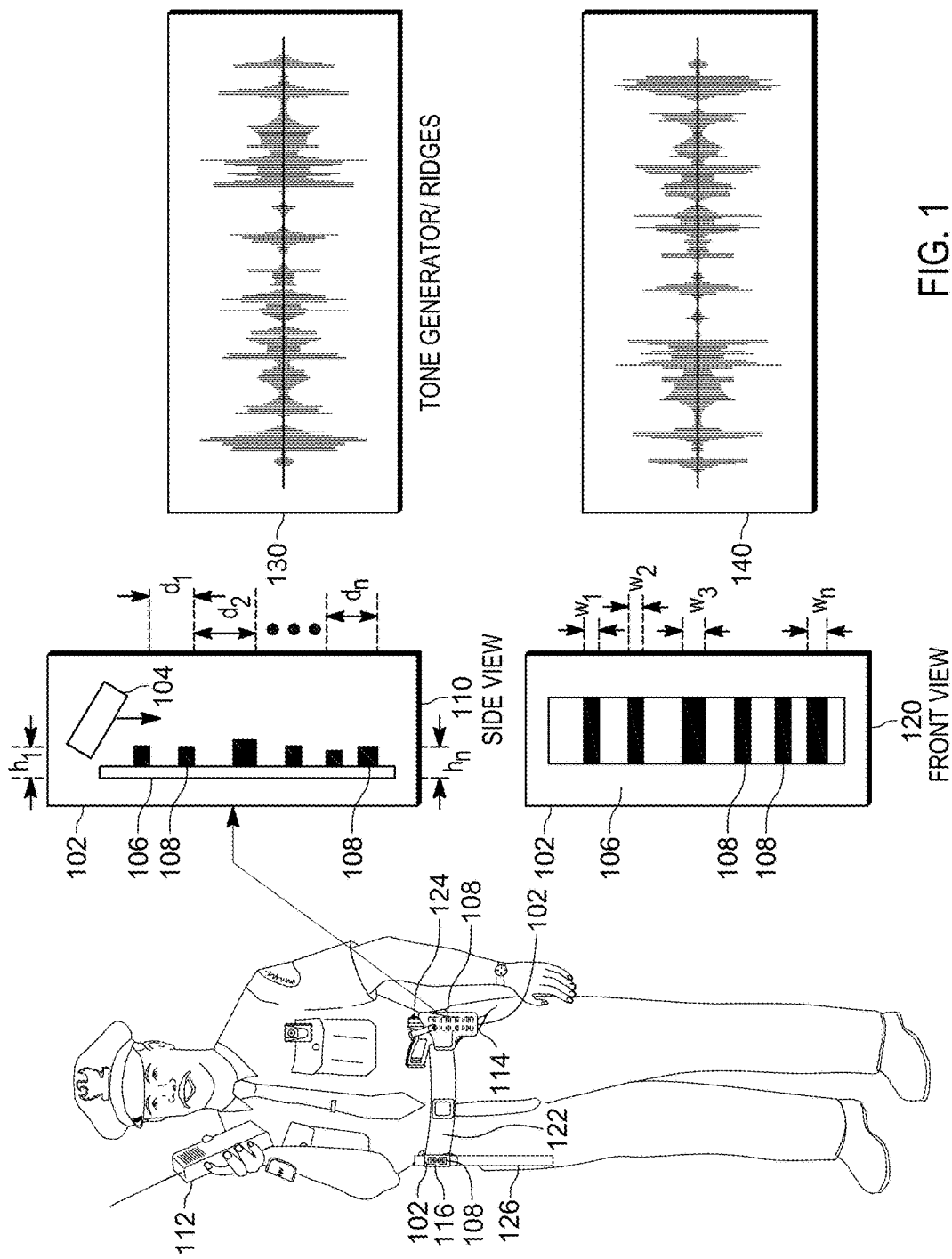
FIG. 1 is diagram of an apparatus formed and operating in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, there is provided herein an apparatus, method and communication system for acoustically detecting the deployment of equipment. The equipment may comprise portable objects, such as a gun, taser or baton, used by law enforcement. The apparatus comprises plurality of acoustical ridges integrated within a body wearable accessory. A predetermined sound pattern is generated from the acoustical ridges in response to sliding the portable object across the plurality of acoustical ridges integrated within the body worn accessory. Information pertaining to the portable object, such as dynamic information pertaining to the removal and insertion of the portable object to and from the body worn accessory is determined. A communication system including a portable communication device can store the information and/or transmit alert signals, in real time, to a base station for monitoring and tracking deployment of the portable object.

FIG. 1 is a diagram of an apparatus formed and operating in accordance with some embodiments. The apparatus of FIG. 1 comprises a body wearable accessory 102, and a plurality of acoustical ridges 108 integrated within the body worn accessory. The plurality of acoustical ridges 108 provide an acoustic ridge feature to the body wearable accessory 102. The plurality of acoustical ridges 108 may be disposed on a substrate 106, or integrated directly into the body wearable accessory 102. The substrate 106 and/or body wearable accessory 102 provide an appropriate surface and stiffness for the acoustical ridges 108 to allow for the generation of acoustical tones. Material and geometry are selected to ensure adequate acoustic tone amplitude and signature. The acoustic tone amplitude need only be sufficient for detection by a live radio microphone of portable communication device 112. The body wearable accessory 102 provides retention for a portable object 104 insertable therein and removable therefrom. In accordance with some embodiments, the plurality of acoustical ridges generate acoustical tones in response to the portable object 104 being slid against the plurality of acoustical ridges 108. The acoustical tones generate predetermined sound patterns which are associated with information pertaining to the portable object. The acoustical tones generate predetermined sound patterns for identifying insertion and removal of the portable object 104. The predetermined sound patterns are beneficially generated without the use of a power source.

In accordance with some embodiments, the generated acoustical tones may comprise a first sound pattern 130 in response to the portable object 104 being slid against the plurality of acoustical ridges in a first direction, and a second sound pattern 140 in response to the portable object 104 being slid against the plurality of acoustical ridges in a second, opposite, direction. In accordance with some embodiments, the two sounds patterns 130, 140 are generated by the acoustical ridges 108 which may be formed, as shown in side view 110 and front view 120, of one or more of: formed of variable heights ($h_1$-$h_n$), formed of variable widths ($w_1$-$w_n$), formed of variable acoustic materials, and/or are separated by variable distances ($d_1$-$d_n$). The variation of the acoustical ridges 108 allows for the first sound pattern 130 to be generated upon sliding the portable object 104 in a first direct, and a second, opposite sound pattern to be generated upon sliding the portable object 104 in a second direction. In accordance with some embodiments, the first and second sound generated sound patterns indicate whether the portable object 104 is being inserted to or removed from the body wearable accessory.

In accordance with some embodiments, the plurality of acoustical ridges 108 generate the acoustical patterns in response to a portable object 104, for example, a firearm 124, taser or baton 126, being slid against the plurality of acoustical ridges 108. In accordance with some embodiments information pertaining to the portable object 104 is determined. The information may comprise static and/or dynamic information pertaining to the portable object 104, and even the user of the portable object, if desired. The dynamic information may comprise withdrawal status and insertion status, where the generated acoustical tones indicate whether the portable object 104 is being inserted to or removed from the body wearable accessory.

Static information may comprise, for example, a predetermined acoustical pattern associated with the type of portable object 104 and/or the predetermined acoustical pattern associated with the identity of a user of the body worn accessory 102.

In some embodiments, the body worn accessory 102 may comprise a holster 114 for a firearm or taser 124. In some embodiments, the body worn accessory 102 may comprise a loop or lanyard 116 coupled to a belt 122 for retaining a baton 126, such as those used in law enforcement.

Figure 2:
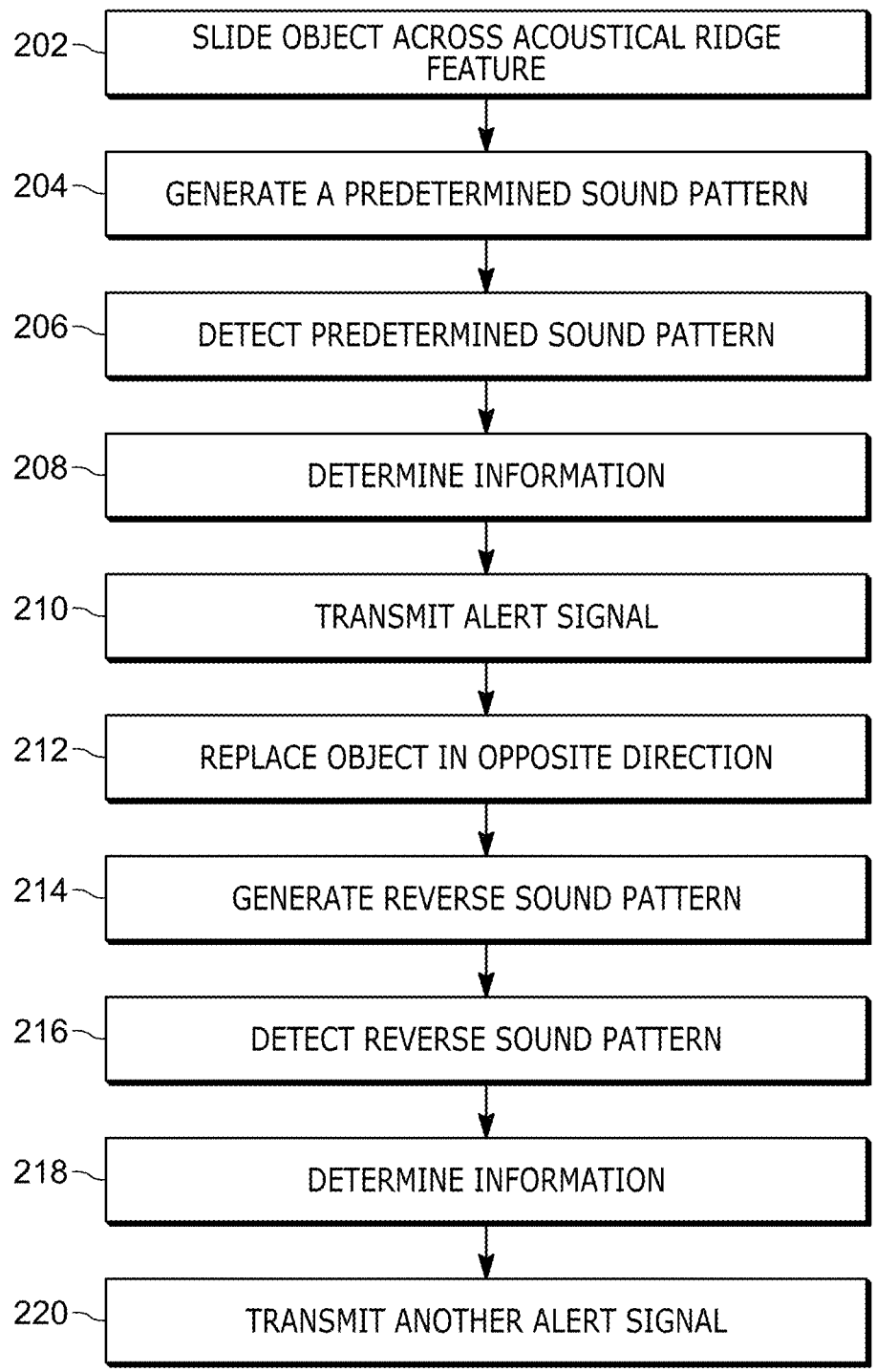
FIG. 2 is flowchart of a method of determining information pertaining to a portable object in accordance with some embodiments.

FIG. 2 is a method of determining information pertaining to a portable object in accordance with some embodiments. The method begins at 202, by sliding a portable object across a plurality of acoustical ridges integrated within a body worn accessory and generating at 204, a predetermined sound pattern in response thereto. For example, sliding a firearm out of a holster will generate a first predetermined acoustic pattern.

The method continues at 206 by detecting the predetermined sound pattern at a portable communication device, and determining at 208, at the portable communication device, information pertaining to the portable object in response to the detected predetermined sound pattern. The information pertaining to the portable object may comprise static information such as identification of object type and/or user identification associated with the portable object. This static information still originates based on the dynamic movement of the object into and out of the portable body worn accessory and the generation of acoustical tones. In some embodiments, the predetermined sound patterns may be assigned to a predetermined object associated with a predetermined user. The information pertaining to the portable object may additionally, or alternatively, comprise dynamic information pertaining to the portable object, such as insertion and removal status of the portable object into and out of the body worn accessory and/or speed of insertion and removal of the portable object into and out of the body worn accessory. For example, the portable communication device embodied as a portable radio may determine that a portable object, embodied for example as a firearm, has been removed from the body worn accessory, embodied for example as a holster, based on the sound pattern generated from the holster. The sound pattern generated from the holster may further identify an officer assigned to that holster, and the speed with which the firearm was removed.

The method continues at 210 by transmitting an alert signal from the portable communication device to a base station indicative of the determined information pertaining to the portable object. That alert signal may comprise some or all of the static and/or dynamic information pertaining to the insertion of the portable object into the body worn accessory.

The portable object may be replaced, by sliding the portable object in the opposite direction, into the body worn accessory at 212. Sliding the portable object back into the body worn accessory will generate a second, or reverse, predetermined acoustic pattern at 214. For example, replacing the firearm into the holster will generate an opposite sound pattern from the first, slide-in, sound pattern. The portable communication device then detects at 216, the second, opposite, predetermined sound pattern. The portable communication device then determines information at 218, pertaining to the replacement of the portable object to the body worn accessory. Again, this information may comprise static information pertaining to the object and/or dynamic information pertaining to the replacement of the object within body worn accessory. For example, a portable radio may determine that a firearm has been re-inserted back into a holster, the amount of time the firearm was removed from the holster, and that the appropriate firearm was re-inserted back into the holster.

The portable communication device may then transmit another alert signal at 220, to a base station or dispatch center. That alert signal may comprise some or all of the static and/or dynamic information pertaining to the re-insertion of the portable object within the body worn accessory.

Figure 3:
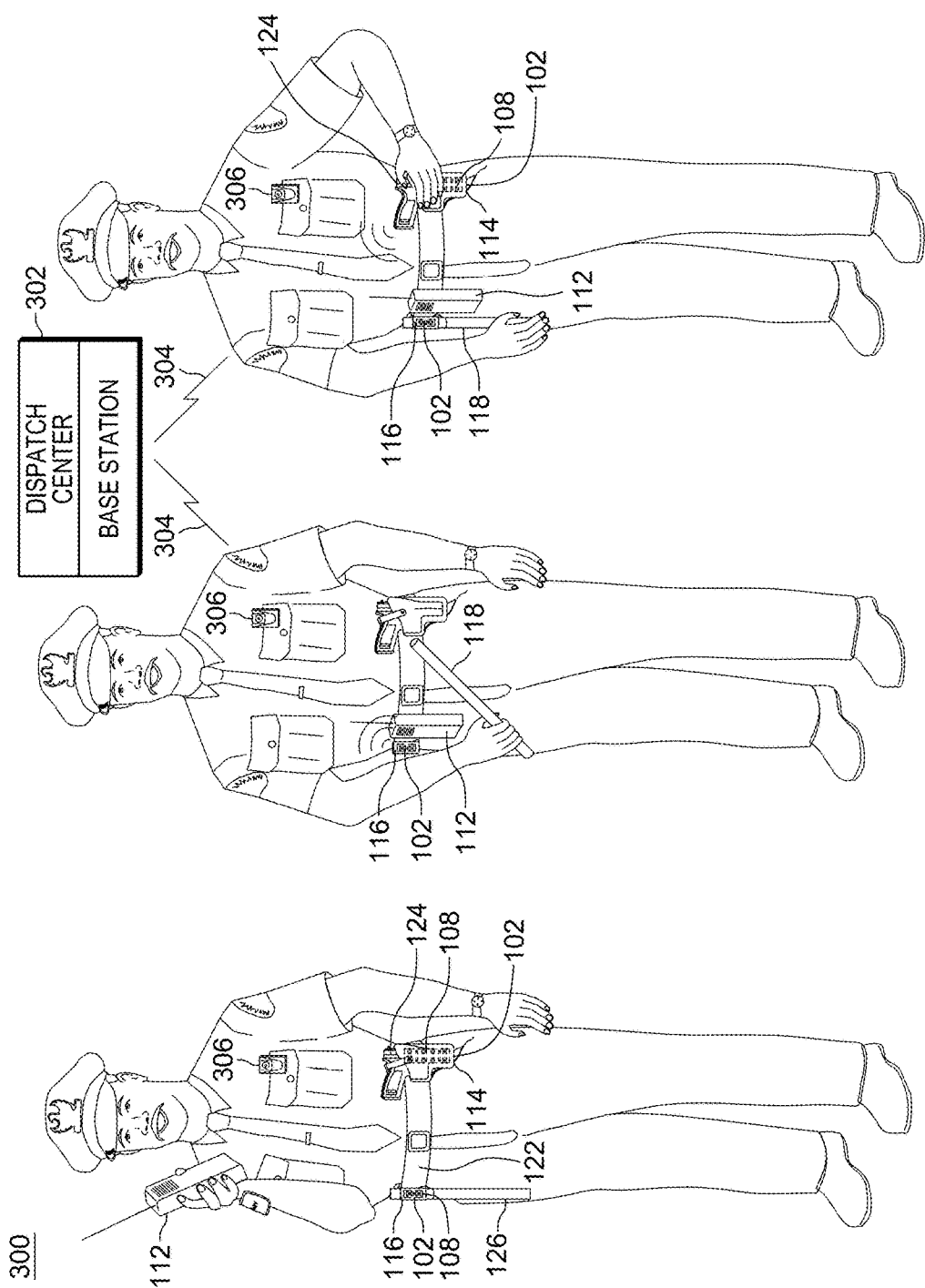
FIG. 3 is a communication system formed and operating in accordance with some embodiments.

FIG. 3 is a communication system formed in accordance with some embodiments. Communication system 300 comprises a portable communication device, a body worn accessory 102 with a portable object inserted therein, and a base station, 302. The portable communication device 112 may comprise, for example, a portable radio and/or remote microphone, or other communication device having a microprocessor and microphone. In accordance with the embodiments, body worn accessory 102 comprises the plurality of acoustical ridges 108 integrated therein to generate acoustical tones in response to the portable object being inserted into and removed from the body worn accessory 102. The body worn accessory 102 may comprise for example, holster 114, belt loop 116, or other body worn accessory that provides portable object retention, along with the incorporation of acoustical ridges 108 as previously described. For example, in communication system 300, holster 114 may carry firearm or taser 124, the holster comprising the plurality of acoustical ridges 108 integrated therein, as previously described. Communication system 300 may further comprise, for example, a loop or lanyard 116 be coupled to belt 122 to carry baton 126, the belt loop 122 having the integrated acoustical ridges 108 integrated therein.

In accordance with some embodiments, the portable communication device 112 comprises at least one microphone, operating as a live microphone, to detect the acoustical tones in response to the portable object being slid into or out of the body worn accessory 102. The microphone is coupled to a low current processor for monitoring ambient audio. In accordance with some embodiments, the portable communication device captures information pertaining to the portable object. The generated acoustical tones are received by the microphone and processed via an internal controller of the communication device. The processed acoustic tones can be applied to a microprocessor of the portable communication device 112, for example a portable radio, which identifies the portable object, a withdrawal status of the portable object from the body worn accessory 102, an insertion status of the portable object to the body worn accessory, and length of time between withdrawal and reinsertion. The use of existing radio circuitry provides the benefit of maintaining parts count and size of the portable communication device. The detected information may be stored in a memory of the portable communication device, and/or the detected information may be transmitted by the portable communication device as a radio frequency (RF) signal 304, containing the information, to base station or dispatch center 302.

In this example, as mentioned previously, the portable object 104 is depicted as a firearm or taser 124 which is insertable to and removable from holster 114, the holster comprising the plurality of acoustical ridges integrated therein, as previously described. The portable communication device 112 detects the acoustic patterns via the portable radio's microphone, and determines via radio processing of the acoustical tones, information associated with the firearm or taser. This information can be static and/or dynamic information. The portable radio may store the detected information and/or transmit the information to base station or dispatch center 302. Information, such dynamic information pertaining to withdrawal and re-insertion of the gun or taser, as well as elapsed time therebetween can be monitored. Communication system 300 may further comprise a body worn camera 306 operatively coupled, wired or wirelessly, to the portable communication device 112. The portable communication device 112, embodied for example as a portable radio, may trigger the body worn camera 306 in response to the acoustical tones generating a sound pattern indicative of withdrawal of the portable object, in the form of, for example a firearm or taser 124 from body warn accessory 102, embodied as holster 114, and/or baton 126 from body warn accessory 102, embodied as belt loop 116. The portable communication device 112 and body worn camera 306 may be embodied as separate devices, as shown, or combined as a single body worn portable communication device, worn near the shoulder.

Accordingly, there has been provided an apparatus, method and communication system that acoustically detects the deployment of portable objects. The detection of portable objects is particularly beneficial in law enforcement environments, where portable equipment such as a gun, a taser and/or a baton are utilized. The plurality of acoustical ridges integrated within the body worn accessory allows for the generation of acoustical tones in predetermined sound patterns which advantageously provides information pertaining to the portable object without the use of a power source. The incorporation of acoustical ridges within the body worn accessory does not significantly increase the size of the accessory and avoids the use of complex circuitry within the portable communication device. Dynamic information pertaining to the removal and insertion of the portable object to and from the body worn accessory beneficially allows for monitoring and tracking the deployment of law enforcement equipment by a portable radio and/or base station without additional circuitry or weight being added to the portable radio and/or base station.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An apparatus, comprising:
   a body wearable accessory;
   a plurality of acoustical ridges integrated within the body wearable accessory; and
   wherein the body wearable accessory provides retention for a portable object insertable therein and removable therefrom, and the plurality of acoustical ridges generate acoustical tones in response to the portable object being slid against the plurality of acoustical ridges.

2. The apparatus of claim 1, wherein the acoustical ridges are separated by a variable distance.

3. The apparatus of claim 1, wherein the acoustical ridges are formed of variable heights.

4. The apparatus of claim 1, wherein the acoustical ridges are formed of variable widths.

5. The apparatus of claim 1, wherein the acoustical ridges are formed of variable acoustic materials.

6. The apparatus of claim 1, wherein the acoustical ridges are formed of variable heights, formed of variable widths, formed of variable acoustic materials and are separated by variable distances.

7. The apparatus of claim 1, wherein the generated acoustical tones generate a predetermined sound pattern that identifies the portable object.

8. The apparatus of claim 1, wherein the generated acoustical tones indicate whether the portable object is being inserted to or removed from the body wearable accessory.

9. The apparatus of claim 1, wherein the generated acoustical tones comprise:
   a first sound pattern in response to the portable object being slid against the plurality of acoustical ridges in a first direction; and a second sound pattern in response to the portable object being slid against the plurality of acoustical ridges in a second, opposite, direction.

10. The apparatus of claim 1, wherein the body wearable accessory comprises a holster and the portable object comprises a firearm or taser.

11. The apparatus of claim 1, wherein the body wearable accessory comprises a loop coupled to a belt, and the portable object comprises a baton.

12. The apparatus of claim 1, wherein the acoustical tones are generated without using a power source.

13. A method of determining information pertaining to a portable object, comprising:
  sliding a portable object across a plurality of acoustical ridges integrated within a body worn accessory;
  generating a predetermined sound pattern from the acoustical ridges in response to the sliding;
  detecting the predetermined sound pattern at a portable communication device; and
  determining, at the portable communication device, information pertaining to the portable object in response to the detected predetermined sound pattern.

14. The method of claim 13, further comprising:
  transmitting an alert signal from the portable communication device to a base station indicative of the determined information pertaining to the portable object.

15. The method of claim 14, wherein the determined information comprises dynamic information pertaining to the portable object.

16. The method of claim 15, wherein the dynamic information comprises insertion and removal status of the portable object into and out of the body worn accessory.

17. The method of claim 13, wherein generating the predetermined sound pattern from the acoustical ridges in response to the sliding, further comprises:
  generating a first predetermined sound pattern in response to sliding the portable object across the plurality of acoustical ridges in a first direction; and
  generating a second, opposite, predetermined sound pattern in response to sliding the portable object across the plurality of acoustical ridges in a second, opposite, direction.

18. A communication system, comprising:
  a body worn accessory for retaining a portable object, the portable object being insertable to and removable from the body worn accessory;
  a plurality of acoustical ridges integrated within the body worn accessory, the plurality of acoustical ridges generating acoustical tones in response to the portable object being inserted and removed from the body worn accessory; and
  a portable communication device detecting the acoustical tones and identifying an insertion status and a withdrawal status of the portable object to and from the body worn accessory in response to the acoustical tones.

19. The communication system of claim 18, wherein the portable communication device detects the acoustical tones via a microphone of the portable communication device.

20. The communication system of claim 18, wherein the portable communication device generates a radio frequency (RF) signal indicative of a withdrawal status of the portable object from the body worn accessory.

21. The communication system of claim 20, wherein the portable communication device generates a radio frequency (RF) signal indicative of an insertion status of the portable object to the body worn accessory.

22. The communication system of claim 21, further comprising:
  a base station for receiving the RF signal indicative of the withdrawal status of the portable object from the body worn accessory, and for receiving the RF signal indicative of an insertion status of the portable object to the body worn accessory.

23. The communication system of claim 18, wherein the plurality of acoustical ridges generating acoustical tones comprises:
  a first sound pattern in response to the portable object being slid against the plurality of acoustical ridges in a first direction; and
  a second sound pattern in response to the portable object being slid against the plurality of acoustical ridges in a second, opposite, direction.

24. The communication system of claim 18, wherein the portable communication device comprises at least one of:
  a portable radio; and
  a remote microphone device.

25. The communication system of claim 18, wherein the body worn accessory comprises at least one of:
  a holster; and
  a loop coupled to a belt.

26. The communication system of claim 18, wherein the portable object comprises at least one of:
  a firearm;
  a taser; and
  a baton.

27. The communication system of claim 18, further comprising:
  a body worn camera operatively coupled to the portable communication device; and
  wherein the portable communication device triggers the body worn camera in response to the generated acoustical tones indicating the withdrawal status of the portable object from the body worn accessory.

* * * * *